United States Patent
Butcher et al.

(10) Patent No.: US 7,930,526 B2
(45) Date of Patent: Apr. 19, 2011

(54) COMPARE AND BRANCH MECHANISM

(75) Inventors: David John Butcher, Kings' Lynn (GB); Stephen John Hill, Austin, TX (US); Wilco Dijkstra, Cambridge (GB)

(73) Assignee: ARM Limited, Cambridge (GB)

( * ) Notice: Subject to any disclaimer, the term of this patent is extended or adjusted under 35 U.S.C. 154(b) by 1897 days.

(21) Appl. No.: 10/807,499

(22) Filed: Mar. 24, 2004

(65) Prior Publication Data
US 2005/0216712 A1 Sep. 29, 2005

(51) Int. Cl.
G06F 9/00 (2006.01)
G06F 9/44 (2006.01)
G06F 9/445 (2006.01)

(52) U.S. Cl. ......... 712/234; 712/211; 712/233; 712/244

(58) Field of Classification Search .................. 712/208, 712/211, 233, 234, 244
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,587,632 A | 5/1986 | Ditzel | |
| 4,922,414 A | 5/1990 | Holloway et al. | |
| 4,969,091 A | 11/1990 | Muller | |
| 5,136,696 A | 8/1992 | Beckwith et al. | |
| 5,455,775 A | 10/1995 | Huber et al. | |
| 5,619,665 A | 4/1997 | Emma | |
| 5,638,525 A | 6/1997 | Hammond et al. | |
| 5,659,703 A | 8/1997 | Moore et al. | |
| 5,727,227 A * | 3/1998 | Schmidt et al. | 712/36 |
| 5,740,461 A | 4/1998 | Jaggar | |
| 5,742,802 A | 4/1998 | Harter et al. | |
| 5,752,035 A | 5/1998 | Trimberger | |
| 5,784,584 A | 7/1998 | Moore et al. | |
| 5,809,336 A | 9/1998 | Moore et al. | |
| 5,838,948 A | 11/1998 | Bunza | |
| 5,875,336 A | 2/1999 | Dickol et al. | |
| 5,889,982 A * | 3/1999 | Rodgers et al. | 712/229 |
| 5,892,966 A | 4/1999 | Petrick et al. | |
| 5,925,123 A | 7/1999 | Tremblay et al. | |
| 5,926,832 A | 7/1999 | Wing et al. | |
| 5,937,193 A | 8/1999 | Evoy | |
| 5,953,741 A | 9/1999 | Evoy et al. | |
| 6,003,126 A | 12/1999 | Huynh et al. | |
| 6,009,499 A | 12/1999 | Koppala | |
| 6,009,509 A | 12/1999 | Leung et al. | |
| 6,014,723 A * | 1/2000 | Tremblay et al. | 711/1 |
| 6,021,469 A | 2/2000 | Tremblay et al. | |
| 6,026,485 A | 2/2000 | O'Connor et al. | |
| 6,031,992 A | 2/2000 | Cmelik et al. | |

(Continued)

OTHER PUBLICATIONS

Free On-Line Dictionary of Computing. FOLDOC. © 1995-1998. www.foldoc.org search terms: central processing unit; arithmetic and logic unit; control unit; and machine cycle.*

(Continued)

*Primary Examiner* — Aimee J Li
(74) *Attorney, Agent, or Firm* — Nixon & Vanderhye P.C.

(57) ABSTRACT

A data processing system is provided that includes an instruction decoder 20 responsive to a compare and branch instruction CHKA.X that performs a comparison between first and second values stored in first and second registers Rn, Rm respectively. A target branch address is determined from a pre-programmed stored value and a branch to a sub-routine is performed in dependence upon a result of the comparison.

48 Claims, 5 Drawing Sheets

U.S. PATENT DOCUMENTS

| | | | |
|---|---|---|---|
| 6,038,643 | A | 3/2000 | Tremblay et al. |
| 6,070,173 | A | 5/2000 | Huber et al. |
| 6,088,786 | A | 7/2000 | Feierbach et al. |
| 6,122,638 | A | 9/2000 | Huber et al. |
| 6,125,439 | A | 9/2000 | Tremblay et al. |
| 6,148,391 | A | 11/2000 | Petrick |
| 6,298,434 | B1 | 10/2001 | Lindwer |
| 6,317,872 | B1 | 11/2001 | Gee et al. |
| 6,332,215 | B1 | 12/2001 | Patel et al. |
| 6,338,134 | B1 | 1/2002 | Leung et al. |
| 6,349,377 | B1 | 2/2002 | Lindwer |
| 6,374,286 | B1 | 4/2002 | Gee et al. |
| 6,484,314 | B1 * | 11/2002 | Ishizaki et al. ............... 717/151 |
| 6,606,743 | B1 | 8/2003 | Raz et al. |
| 6,789,098 | B1 * | 9/2004 | Dijkstra ...................... 708/495 |

OTHER PUBLICATIONS

Wikipedia, the free encyclopedia. © 2003. www.wikipedia.com search term: protected mode.*

Hyde, Randall. "The Art of Assembly Language Programming". © 1996. http://www.arl.wustl.edu/~lockwood/class/cs306/books/artofasm/toc.html Chapters: Table of Contents; Chapter 6 Part 2; and Chapter 6 Part 5.*

Hennessy, John L. and Patterson, David A. "Computer Organization and Design the Hardware/Software Interface". Second Edition. San Francisco, CA: Morgan Kaugmann Publishers, Inc., © 1998. pp. 410-416.*

Hamacher, V. Carl; Vranesic, Zvonko G.; and Zaky, Safwat G. "Comptuer Organization". Second Edition. New York, New York: McGraw-Hill Book Company, © 1984. pp. 180-194.*

Hennessy, John L. and Patterson, David A. "Computer Architecture a Quantitative Approach". Second Ediction. San Francisco, CA: Morgan Kaugmann Publishers, Inc., © 1996. pp. 179-185.*

Hennessy, John L. and Patterson, David A. "Computer Architecture a Quantitative Approach". Third Ediction. San Francisco, CA: Morgan Kaugmann Publishers, Inc., © 2003. pp. A-38 to A-45.*

H. Stone, Chapter 12—"A Pipeline Push-Down Stack Computer", 1969, pp. 235-249.

C. Glossner et al, "Delft-Java Link Translation Buffer", Aug. 1998.

N. Vijaykrishnan et al, "Object-Oriented Architectural Support for a Java Processor" 1998, pp. 330-355.

C. Glossner et al, "The Delft-Java Engine: An Introduction", Aug. 1997.

K. Ebcioglu et al, "A Java LLP Machine Based on Fast Dynamic Compilation", Jan. 1997, pp. 1-13.

A. Wolfe, "First Java-specific chip takes wing" *EETimes*—1997.

Y. Patt, *Introduction to Computing Systems From Bits and Gates to C and Beyond*, 1999, pp. 1-517.

M. Ertl, "Stack Caching for Interpreters" 1994, pp. 1-10.

M. Ertl, "Stack Caching for Interpreters" 1995, pp. 1-13.

M. Ertl, "Implementation of Stack-Based Languages on Register Machines" Apr. 1996, pp. 1-4.

K. Andrews et al, "Migrating a CISC Computer Family Onto RISC Via Object Code Translation" 1992, pp. 213-222.

J. O'Connor et al,"PicoJava I Microprocessor Core Architecture" Oct. 1996, pp. 1-8, Sun Microsystems.

M. Ertl, "A New Approach to Forth Native Code Generation" 1992.

M. Maierhofer et al, "Optimizing Stack Code" 1997, p. 1-9.

D. Ungar et al, "Architecture of SOAR: Smalltalk on a RISC" The 11th Annual International Symposium on Computer Architecture, Jun. 1984, pp. 188-197.

O. Steinbusch, "Designing Hardware to Interpret Virtual Machine Instructions" Feb. 1998, pp. 1-59.

R. Kapoor et al, "Stack Renaming of the Java Virtual Machine" Dec. 1996, pp. 1-17.

A. Yonezawa et al, "Implementing Concurrent Object-Oriented Languages in Multicomputers" *Parallel and Distributed Technology (Systems and Applications)* May 1993, pp. 49-61.

C. Hsueh et al, "Java Bytecode to Native Code Translation; The Caffeine Prototype and Preliminary Results" IEEE/ACM International Symposium on Microarchitecture, Dec. 1996, pp. 90-97.

Y. Patt et al, *Introduction to Computing Systems From Bits and Gates to C and Beyond*, 2001, pp. 1-526.

Sun Microsystems PicoJava Processor Core Data Sheet, Dec. 1997, pp. 1-11.

H. McGhan et al, PicoJava a Direct Execution Engine for Java Bytecode, Oct. 1998, pp. 22-26.

Y. Patt, *Introduction to Computing Systems From Bits and Gates to C and Beyond*, 1999, pp. 10-12 & 79-82.

Espresso—The High Performance Java Core Specification, Oct. 2001, pp. 1-33, Aurora VLSI, Inc.

J. Gosling, "Java Intermediate Bytecodes" 1995, pp. 111-118.

P. Koopman, Jr. "Stack Computers The New Wave" 1989, pp. 1-234.

J. O'Connor et al, "PicoJava-I: The Java Virtual Machine in Hardware" *IEEE Micro* A Case for Intelligent RAM, Mar./Apr. 1997, pp. 45-53.

M. Mrva et al, "A Scalable Architecture for Multi-Threaded JAVA Applications" Design Automation and Test in Europe, Feb. 1998, pp. 868-874.

L. Chang et al, "Stack Operations Folding in Java Processors" *IEEE Proc.—Comput. Digit. Tech.*, vol. 145, No. 5, pp. 333-340 Sep. 1998.

L. Ton et al, Proceedings of the '97 International Conference on Parallel and Distributed Systems, "Instruction Folding in Java Processor", pp. 138-143, Dec. 1997.

K. Buchenrieder et al, "Scalable Processor Architecture for Java With Explicit Thread Support" *Electronics Letters* vol. 33, No. 18, pp. 1532+, Aug. 1997.

C. Chung et al, Proceedings of the '98 International Conference on Parallel and Distributed Systems, "A Dual Threaded Java Processor for Java Multithreading" pp. 693-700, Dec. 1998.

I. Kazi et al, "Techniques for Obtaining High Performance in Java Programs" Sep. 2000, pp. 213-240.

R. Kieburtz, "A RISC Architecture for Symbolic Computation" 1987, pp. 146-155.

M. Berekovic et al, "Hardware Realization of a Java Virtual Machine for High Performance Multimedia Applications", pp. 479-488, 1997.

P. Deutsch, "Efficient Implementation of the Smalltalk-80 System" 1983, pp. 297-302.

J. Davis; "Rockwell Produces Java Chip" Sep. 1997, CNET NEWS. COM, pp. 1 of 3.

* cited by examiner

| Instruction | CHKA.X Rn, Rm (16-bit) | | | | | | | | | | | | | | | |
|---|---|---|---|---|---|---|---|---|---|---|---|---|---|---|---|---|
| Encoding | 15 | 14 | 13 | 12 | 11 | 10 | 9 | 8 | 7 | 6 | 5 | 3 | 2 | 0 |
| | < | opcode | > | | | | | | H1 | H2 | Rm | | Rn |
| Thumb-2 Equivalent | CMP Rn, Rm<br>MOV LS lr, pc<br>ADD LS pc, HandlerBase, #·8 |
| Definition | IF (unsigned) Rm >= (unsigned) Rn<br>  lr = pc<br>  pc, HandlerBase, #·8; IndexException |
| Encoding space | 2^8 | 8 bits |
| Note | This is based upon the CMP(3) 16-bit Thumb-2 instruction that can use high registers |
| Note | H1 contains the most significant bit for Rn, H2 the most significant bit for Rm |
| Note | The LS case should almost never occur, so can be treated as exceptional behaviour |
| Note | This instruction does not set condition flags |
| Note | This comparison is UNSIGNED |
| Note | Return stack prediction will not be required when the MOV lr,pc step is executed. |

FIG. 5

COMPARE AND BRANCH MECHANISM

BACKGROUND OF THE INVENTION

1. Field of the Invention

The invention relates to the field of data processing systems. More particularly, this invention relates to programmable data processing systems in which an instruction decoder is responsive to program instructions to control processing logic to perform data processing operations specified by computer program instructions.

2. Description of the Prior Art

It is known to provide data processing systems that support more than one instruction set. Examples of such data processing systems are the processor cores designed by ARM Limited of Cambridge, England. ARM processors typically support two instruction sets: the ARM instruction set in which all instructions are 32-bits long; and a Thumb instruction set that compresses the most commonly used instructions into a 16-bit format. ARM Jazelle processors include a third instruction set—Java bytecodes and can easily switch between a Java state in which Java bytecodes are treated as native instructions and the ARM/Thumb state. It is difficult to produce an efficient highly pipelined processor that is able to execute Java bytecodes as native instructions.

An alternative approach is that bytecodes are translated into native ARM/Thumb instructions by a Just In Time (JIT) compiler or a dynamic adaptive compiler. Such translators often produce code that is considerably larger in size that the original non-native bytecodes thus requiring a disadvantageously increased amount of storage space.

It is known to provide a single instruction in which a comparison and a branch that switches program execution from one point to another are combined. Such known compare and branch instructions calculate a target branch point using a field within the instruction itself. This is done, for example, by specifying a 16-bit offset in a field of the instruction and by computing the target branch address from the offset relative to the memory address of the branch instruction itself. For a fixed-size instruction of say 32-bits, the number of bits available to specify the target branch point is limited. The lack of flexibility in the range of target branch addresses that may be specified within the instruction is particularly disadvantageous when dealing with unplanned changes in the flow of control of the program such, as when an exception occurs, or in the case of branch instructions to long-range subroutine calls.

SUMMARY OF THE INVENTION

Viewed from one aspect the present invention provides apparatus for processing data comprising:

processing logic operable to perform data processing operations; and an instruction decoder operable to decode program instructions to control said processing logic to perform data processing operations specified by said program instructions;

wherein said instruction decoder is responsive to a compare and branch instruction:

(i) to perform a comparison between a first value stored in a first register and a second value stored in a second register;

(ii) to determine a target branch address from a pre-programmed stored value; and (iii) to branch to a sub-routine at said target branch address in dependence upon a result of said comparison.

The present technique recognises that provision of a compare and branch instruction in which the target branch address is determined from a pre-programmed stored value rather than being calculated from a relative address specified within the instruction itself allows for greater flexibility in the range of addresses that may be specified for the target branch address. This way of determining the target branch address is of particular advantage for implementing branches to long-range subroutines since it allows access to a wider range of memory addresses.

Provision of the new branch and compare instruction with the pre-programmed stored target branch address also has the advantage that a branch predictor can be arranged to disregard the new instruction. A branch predictor has a limited storage capacity used to cache branch results from recently executed branch instructions. In cases where the compare and branch instruction according to the present technique is associated with an infrequent branch operation, such as a branch to an exception handler routine, it advantageous to avoid occupying the limited branch predictor memory with branch results that are unlikely to be required.

It will be appreciated that the compare and branch instruction according to the present technique could be employed for any of a number of different functions, for example to check that a variable is in range, to branch to an exception handling routine, or to implement a conditional branch such as a loop exit. However, in preferred embodiments, the compare and branch instruction is an array bounds checking instruction that branches to an array bounds exception handling routine.

The new instruction is particularly advantageous in this context since in object-oriented programming languages, such as Java, an array range check is typically performed for every array access. Accordingly, non-native code such as Java bytecodes frequently includes an array range checking instructions. Accordingly, by combining the comparison and branch in a single instruction the overall quantity of native translated code can be reduced yet the instruction has sufficient flexibility to allow branching from the main program sequence to a wide range of different memory addresses where array bounds exception handlers are stored.

The particular exception handler to be invoked can be selectable in dependence upon the method where the exception was thrown.

Where the compare and branch instruction according to the present technique is an array bounds checking instruction, it is further preferred that the first value of the comparison is a reference value that specifies an array size and the second value is a test value corresponding to an array index determined from a decoded native program instruction. This is an effective way of performing a check to determine whether the array index being accessed by the native program instruction is out of bounds. For example if the array size is "n−1" and the decoded value is "n" or "−2" then the array index is out of bounds and an array bounds exception handler can be invoked.

It will be appreciated that the comparison could be any one of a number of different logical operations, for example an equality check or a determination of the value having largest absolute magnitude. However, in preferred embodiments where the compare and branch instruction is an array bounds checking instruction it is further preferred that the comparison comprises determining if the reference value is greater than or equal to the test value (this is an unsigned test on signed values). This provides an efficient check as to whether the attempted array access at the test value is within the uppermost limit of the range of array indices specified by the reference value.

It is particularly efficient to determine a result of the comparison from a carry flag value and zero flag value. This has the advantage that the mechanisms for setting and checking these flags are likely to already be present for more general use.

Although the first register and second register could be predetermined registers, it is preferred that at least one of the first register and the second register are specified within a field of the compare and branch instruction. This gives the programmer more flexibility when implementing the instruction.

It will be appreciated that the branch could be performed in a number of different ways, but in preferred embodiments, the branch involves copying a pointer to an array bounds exception handling routine into the program counter that specifies the next program instruction. A branch to the array bounds exception handling routine enables software to determine from the return address the location of the cause of an array bounds exception and to perform any appropriate remedial and/or diagnostic operations.

Although the pointer to the array bounds exception handling routine could be stored in a register and copied to the program counter from a register in the register file of the main processor core, it is preferred that the exception handling routine pointer be stored in a coprocessor register. Typically the exception handling routine pointer is a static value and so may conveniently be stored within a coprocessor configuration register thus avoiding unnecessarily occupying register file registers that might be utilised for other purposes.

It will be appreciated that the compare and branch instruction could take several processing cycles to execute, but in preferred embodiments the hardware is configured such that the compare and branch instruction is executed within a single processor clock cycle when the branch is not taken.

The decoder is operable to decode translated non-native program instructions. These non-native program instructions could have a variety of different forms but the present technique is particularly useful when the non-native program instructions are platform-independent program instructions, such as Java bytecodes, MSIL bytecodes, CIL bytecodes and NET bytecodes.

Although the data processing apparatus having a user mode and a privileged mode could be in the user mode when the comparison is performed and transition to the privileged mode when a branch is taken, in preferred embodiments the data processing apparatus remains in the user mode during execution of the compare and branch instruction.

Viewed from another aspect the present invention provides a method of processing data with an apparatus for processing data having processing logic operable to perform data processing operations and an instruction decoder operable to decode program instructions to control said processing logic to perform data processing operations specified by said program instructions, said method comprising the steps of:

in response to a compare and branch instruction decoded by said instruction decoder controlling said processing logic:

(i) to perform a comparison between a first value stored in a first register and a second value stored in a second register; and (ii) to branch to a sub-routine in dependence upon a result of said comparison.

Viewed from a further aspect the present invention provides a computer program product including a computer program operable to control an apparatus for processing data having processing logic operable to perform data processing operations and an instruction decoder operable to decode program instructions to control said processing logic to perform data processing operations specified by said program instructions, said computer program comprising:

a compare and branch instruction decodable by said instruction decoder to control said processing logic:

(i) to perform a comparison between a first value stored in a first register and a second value stored in a second register;

(ii) to determine a target branch address from a pre-programmed stored value; and (iii) to branch to a sub-routine at said target branch address in dependence upon a result of said comparison.

Viewed from a further aspect the present invention provides a computer program product including a computer program operable to translate non-native program instructions to form native program instructions directly decodable by an apparatus for processing data having processing logic operable to perform data processing operations and an instruction decoder operable to decode program instructions to control said processing logic to perform data processing operations specified by said program instructions, said native program instructions comprising:

a compare and branch instruction decodable by said instruction decoder to control said processing logic:

(i) to perform a comparison between a first value stored in a first register and a second value stored in a second register;

(ii) to determine a target branch address from a pre-programmed stored value; and (iii) to branch to a sub-routine at said target branch address in dependence upon a result of said comparison.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 schematically illustrates an array bounds checking instruction according to the present technique.

DESCRIPTION OF THE PREFERRED EMBODIMENTS

Figure 1:
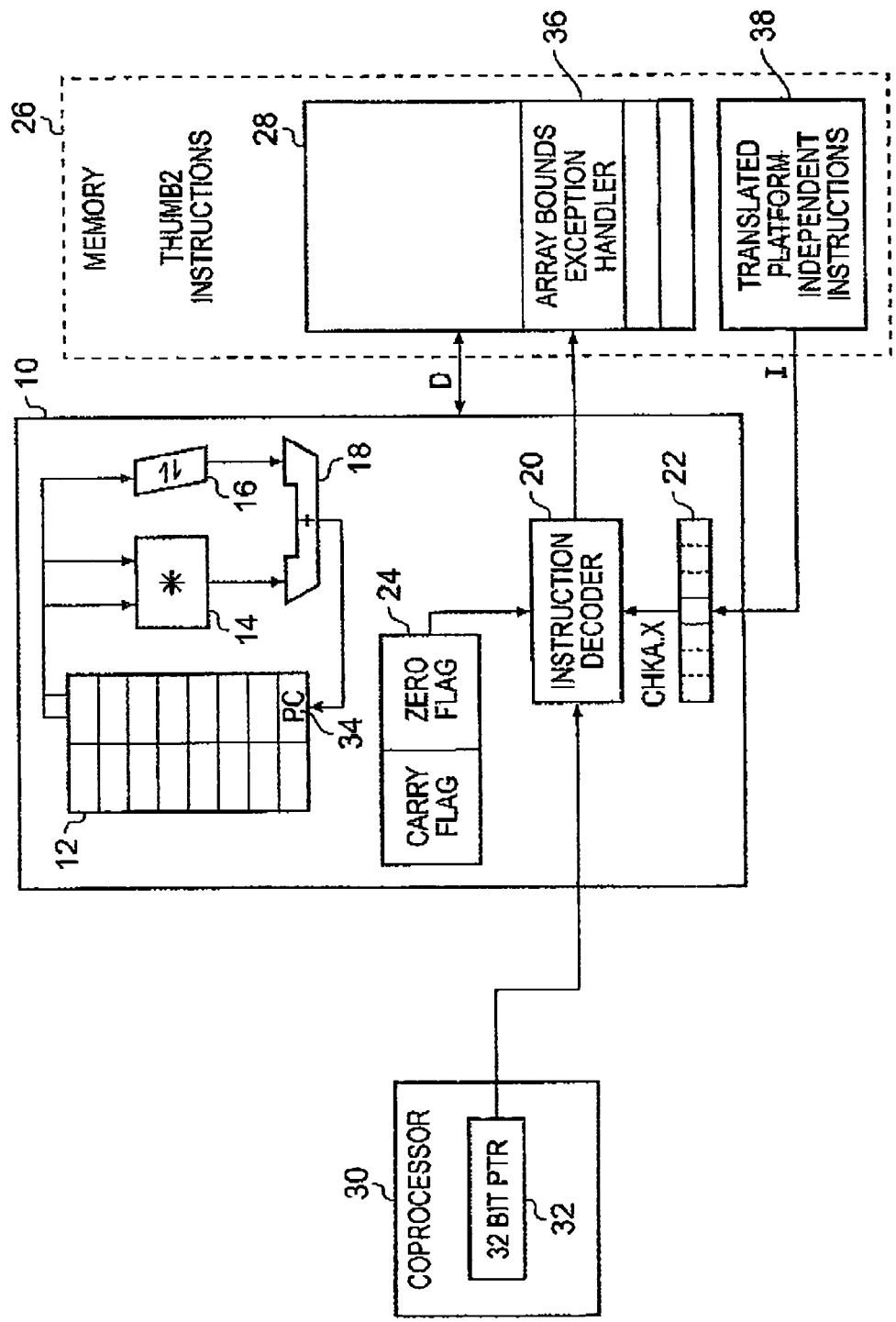
FIG. 1 schematically illustrates a data processor apparatus using compare and branch instructions that have a target branch address that is determined from a pre-programmed stored value.

FIG. 1 schematically illustrates a data processor according to the present technique. The data processor comprises: a processor core 10 having a register file 12, a multiplier 14, a shifter 16, an adder 18, an instruction decoder 20 and an instruction pipeline 22. Carry and zero flag values 24 (set by the most recent instruction to execute) is supplied as input to the instruction decoder 20. (Alternatively a carry out from the adder signal could be used). Associated with the processor core 10 are a co-processor 30 that stores a 32-bit pointer value and a memory 26 that stores translated platform-independent instructions 38 and a series of handler routines, including an array bounds exception handler 36.

The processor core 10 is operable to execute processing operations on data values stored in the register file 12 by reading the data values from the register and supplying them to appropriate ones the multiplier 14, shifter 16 and adder 18 logic gates together with control signals for those processing elements. The results of the processing operations are output by the adder 18 and stored in locations in the register file 12. The register file 12, the multiplier 14, the shifter 16 and the adder 18 together represent processing logic for performing processing operations under control of program instructions that have been decoded by the instruction decoder 20. It will be appreciated that the data processing apparatus may comprise further processing logic to perform the processing operations and the circuit elements illustrated in FIG. 1 are just a representative set.

A predetermined register 34 is used to store a value of a program counter that is an index to a current program instruction to be executed. Translated platform-independent instructions are stored in a predetermined region 38 of the memory 26 and these instructions are fed to the instruction pipeline 22 for subsequent execution under the control of the instruction decoder 20. The instruction decoder 20 generates control signals to control the processing logic to effect execution of the sequence of program instructions fed to it via the instruction pipeline 22.

The coprocessor 30 is a configuration coprocessor that has a plurality of configuration registers operable to store parameters associated with the processor core 10. A single one of these registers is illustrated and this stores a 32 bit pointer to a sub-routine to which a branch associated with the new compare and branch instruction may be performed.

The translated platform independent instructions 38 include an array bounds checking instruction CHKA.X, which is an example of a compare and branch instruction according to the present technique. In response to receipt of a CHKA.X instruction from the instruction pipeline 22, the instruction 20 decoder reads a first value from a first register location and a second value from a second register location. The register locations are variables specified in fields of the array bounds checking instruction and are in this embodiment locations in the register file 12. The instruction decoder 20 feeds the register value variables to the processing logic 14, 16, 18 and a value of the carry flag 24 associated with the comparison operation (which is effectively a SUB in this case) is determined. If the carry flag 24 is set (i.e. logical TRUE), then a branch results. If the carry and zero flags 24 are clear (i.e. logical FALSE), then execution of the main sequence of translated instructions proceeds unaltered. The target branch address is not calculated within the CHKA.X instruction itself, but rather is read by the instruction decoder 20 from a register 32 in the co-processor. The target branch address is a 32-bit pointer to an array bounds exception handler routine 36 stored in the memory 26. The exception handler routine 36 is a re-usable sequence of native instructions, in this case Thumb-2 instructions. Thumb-2 is a blended instruction set combining both 16-bit and 32-bit instructions.

Figure 2:
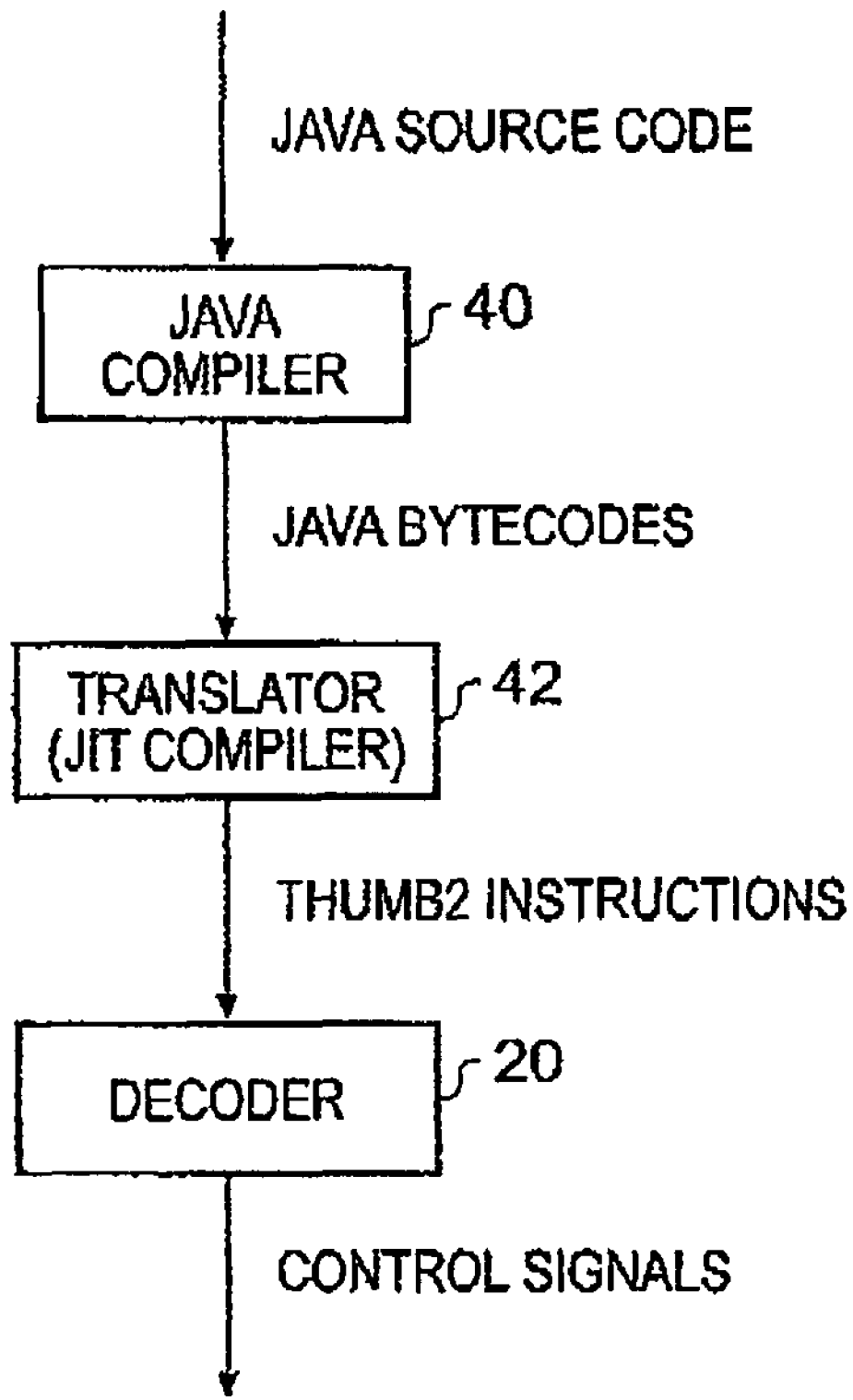
FIG. 2 schematically illustrates the process of converting non-native program instructions into native program instructions starting with source code written in an object-oriented programming language.

FIG. 2 schematically illustrates the process of converting non-native program instructions into native program instructions starting from source code written in an object-oriented programming language, which in this particular case is Java. The conversion process involves a Java compiler 40, a translator 42 and a decoder 44. Rather than producing executable object-code that is specific to a particular processor core (e.g. ARM, MIPS, x86, etc), the Java compiler produces platform-independent instructions known as Java bytecodes. Java bytecodes can be executed on any platform on which a Java virtual machine has been implemented. Alternatively, and in accordance at least a preferred embodiment the present technique, a JIT compiler is used to translate the Java bytecodes into native program instructions. The Java bytecodes are output by the Java compiler 40 and supplied as input to the translator (JIT compiler) 42.

The translator (JIT compiler) 42 translates the non-native bytecodes into native Thumb-2 instructions. There is typically limited memory capacity available for storage of the Thumb-2 instructions. The nature of the mapping will be explained in more detail with reference to FIG. 2. The Thumb-2 instruction set generated by the translator 42 includes the array bounds checking instruction CHKA.X according to the present The Thumb-2 instructions are subsequently supplied to the instruction decoder 20, which generates control signals that control the processing logic to execute the native instructions. The CHKA.X instruction is executed within a single processor cycle. This is achieved by an appropriate hardware configuration in the processor core 10 in accordance with normal optimisation techniques. It will be appreciated that the translator 42 serves to generate the new compare and branch instructions within the translated native program code that it produces. Thus the translated program (output by the translator 42) as well as the program that actually performs the translation can be considered complementary aspect of the present technique. Although in the example of FIG. 2, the non-native program instructions are Java bytecodes, in alternative arrangements they could be NET bytecodes, MSIL bytecodes, or CIL bytecodes for example.

Figure 3:
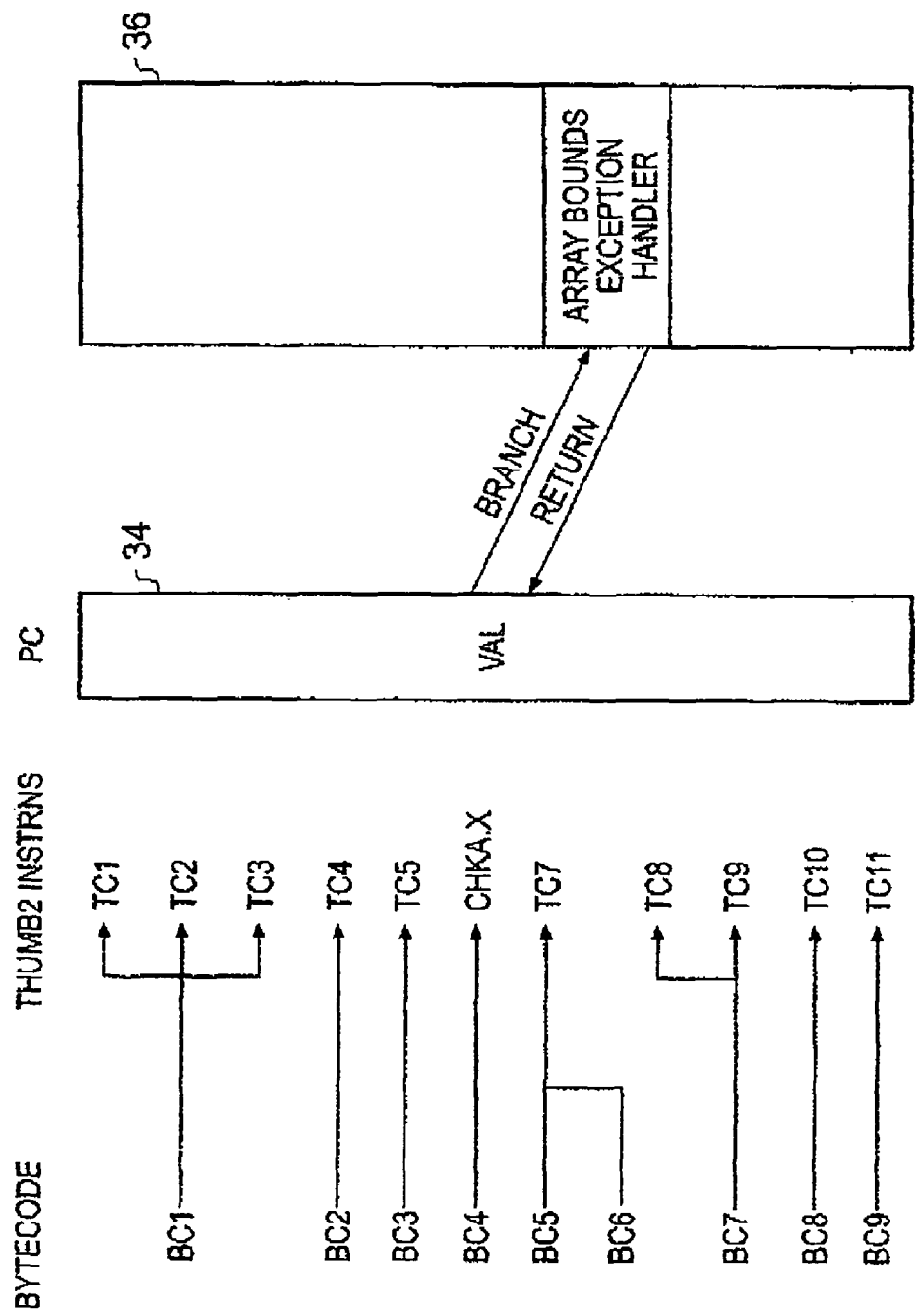
FIG. 3 schematically illustrates relationships between virtual machine bytecodes and native Thumb-2 instructions including an array bounds checking instruction.

FIG. 3 schematically illustrates relationships between the platform independent instructions (bytecodes) and native Thumb-2 instructions, which include an array bounds checking compare and branch instruction. FIG. 3 illustrates a mapping between a set of Java bytecodes BC1, BC2, . . . , BC9 and a corresponding set of Thumb-2 native instructions TC1, TC2, . . . , TC11. The mapping between bytecodes and Thumb-2 instructions may be a one-to-one mapping such as BC2 to TC4, a one-to-many mapping, such as BC1 to TC1, TC2 and TC3, or a many-to-one mapping, such as BC5 and BC6 to TC7. Typically a larger number Thumb-2 instructions than bytecodes are required to achieve that same level of functionality, i.e. the bytecodes have a higher "code density". A principal objective in translator design is to achieve native code having improved code density in comparison to known translators. Achievement of this objective involves a trade-off between the potential reduction in performance by inclusion of more complex instructions involving combined operations and the improved code density that may be achieved by mapping frequently occurring non-native instructions to a single native instruction. Since in Java an array bounds check is normally performed for each and every array access, the Java bytecodes frequently comprise array bounds checking instructions.

In FIG. 3 the bytecode BC4 represents a non-native array bounds checking instruction. It has been established according to the present technique that the code density of native code can be improved without significantly diminishing performance by the inclusion in the Thumb-2 instruction set when in a mode when it is known to be executing translated Java bytecodes of an instruction CHKA.X that combines a compare operation with a branch operation in such a way that the target branch address is programmed (e.g. configured in advance) rather than being calculated within the instruction itself. When the instruction decoder 20 receives the CHKA.X instruction from the pipeline 22, it compares the register values held with the registers specified within the register fields of the variables associated with the instruction and in dependence upon the result of the comparison branches to a sub-routine stored at an address in memory specified by the 32-bit pointer 32. In this case, the sub-routine is an array bounds exception handler. The value of the program counter PC (or the PC subject to a fixed offset), at which the array bounds check was initiated is stored in a link register and is used by software to determine the location of the source of the array bounds exception.

The stored value PC from the link register is used to identify the method that threw the exception and to select a particular exception handler that is appropriate to that method. In this case the 32-bit pointer 32 enables access to the appropriate exception handler via a look-up table. If no exception handler that is directly associated with the given method is found then it is determined whether there is an exception handler associated with the calling method and if so that error handler is invoked. If no handler is found at the next highest level, then the search may be continued as necessary up to the top level of the method calling hierarchy.

In the arrangement of FIG. 1, the processor core 10 is operable in a privileged mode and a user mode. It is to be noted that the processor core remains in the user mode throughout execution of the branch and compare instruction CHKA.X. Following the branch to the array bounds exception handler 36, program execution can return to inline execution of the main sequence native instructions. The return may or may not be to the program counter value immediately subsequent to the point PC at which the branch occurred.

Figure 4:
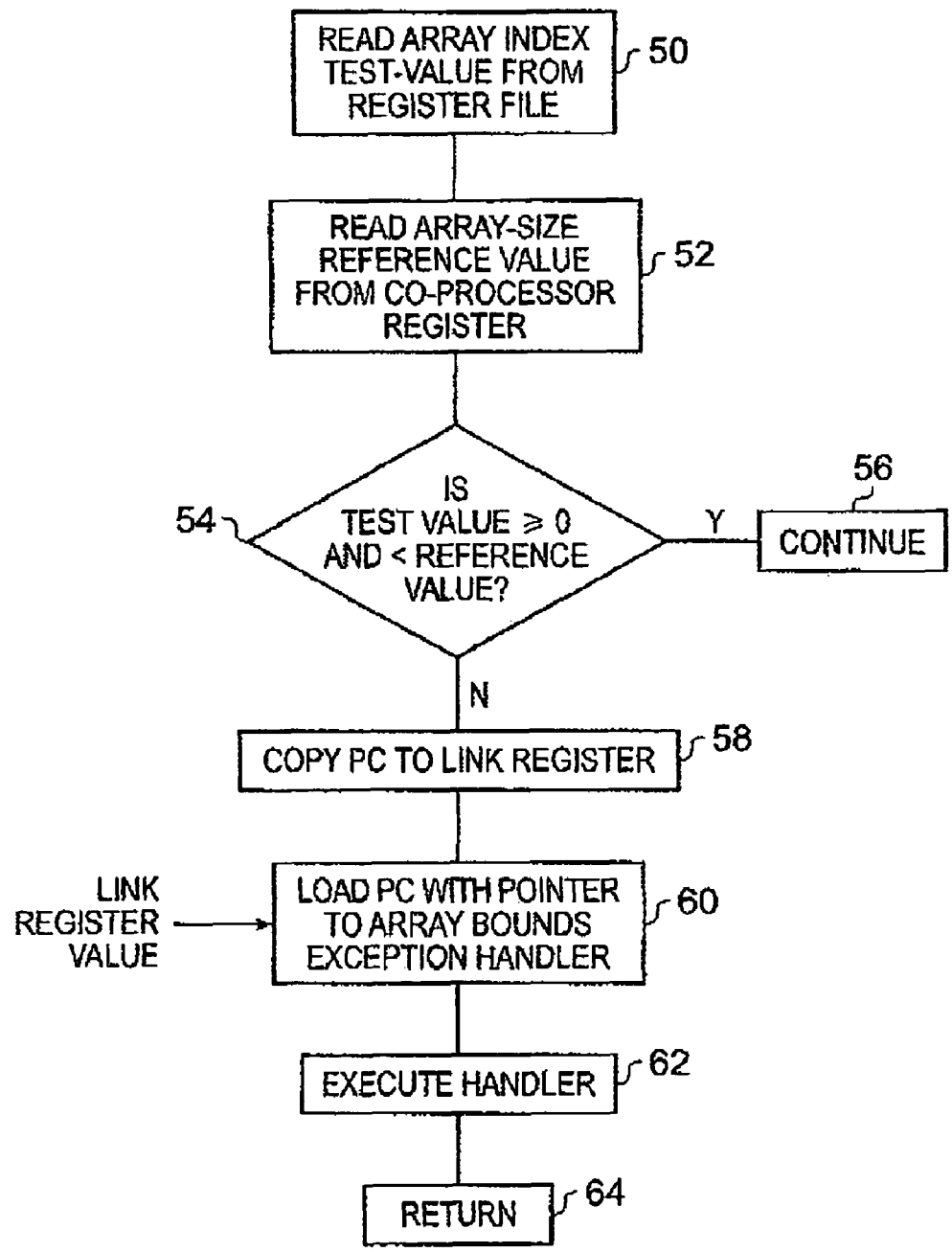
FIG. 4 is a flow chart that schematically illustrates a sequence of operations associated with execution of an array bounds checking instruction.

FIG. 4 is a flow chart that schematically illustrates a sequence of operations associated with execution of an array bounds checking instruction CHKA.X. The sequence of operations begins at stage 50 when a test value corresponding to an array index is read from a first register in the register file 12. At stage 52, a reference value corresponding to an array size is read from a register of the co-processor 30. Note that the array size is not necessarily a static value. Steps 50 and 52 could, if required, be performed in parallel. At stage 54 a test is performed to determine both whether the test value is non-negative and whether the test value is less than the array size. This is implemented by a subtraction AND operation involving the test value and the reference value and the test result is determined from the status of a carry flag and a zero flag associated with the addition. If the carry flag is determined to be CLEAR at stage 54, then the process proceeds to stage 56 where inline execution of the instruction sequence is continued. If on the other hand, the carry flag and the zero flag are determined to be SET at stage 54, then the process proceeds to stage 58 whereupon the current value of the program counter PC is copied to the link register R14 in the register file 12. Next, at stage 60, the program counter 34 is loaded with a pointer to an appropriate array bounds exception handler. The most appropriate bound exception handler is determined from the link register value. The link register value provides an indication of the portion of code with which the array bounds exception is associated. The process then proceeds to stage 62 where the appropriate handler is executed and then on to stage 64 where the program execution returns from the handler sub-routine to the main sequence of instruction execution.

FIG. 5 schematically illustrates the encoding of an array bounds checking instruction according to the present technique. The instruction CHKA.X is a 16-bit instruction that has fields that specify register locations Rn and Rm, from which the first and second values to be compared will be read during execution of the branch and compare instruction. Bits 0 to 2 correspond to Rn; bits 3 to 5 correspond to Rm; bit 6 is labelled H2 and contains the most significant bit for Rm; bit 7 is labelled H1 and contains the most significant bit for Rn; bits 8 through 15 correspond to a Thumb-2 instruction opcode. FIG. 5 also shows the equivalent sequence of three Thumb-2 instructions that would have to be executed if the CHKA.X had not been defined as a single instruction. It can be seen that the CHKA.X instructions is equivalent to a compare instruction CMP that compares register values Rn and Rm followed by a move instruction MOVLS that moves the program counter value "pc" into the link register and then an ADD instruction ADDLS that subtracts 8 bits from a programmed target branch address "HandlerBase" corresponding to the 32-bit pointer 32 and loads the result of the addition into the program counter register R15 to effect the branch operation to an appropriate handler sub-routine. The comparison CMP is an unsigned comparison that determines if Rm is greater than or equal to Rn. If in fact Rm≧Rn then the current value of the program counter is stored in the link register and the pointer to the handler sub-routine is copied to the program counter to effect a branch to that sub-routine.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   processing logic operable to perform data processing operations; and
   an instruction decoder for decoding program instructions to control said processing logic to perform data processing operations specified by said program instructions, wherein said instruction decoder, in response to a compare and branch instruction, comprises a decoder for:
   (i) performing a comparison between a first value stored in a first register and a second value stored in a second register;
   (ii) copying, in dependence upon a result of said comparison, a program counter value to a third register;
   (iii) determining a target branch address from a pre-programmed stored value and said program counter value; and
   (iv) branching to a sub-routine at said target branch address in dependence upon a result of said comparison.

2. The apparatus as claimed in claim 1, wherein said instruction is an array bounds checking instruction and said sub-routine is an array bounds exception handling routine.

3. The apparatus as claimed in claim 1, wherein at least one of said first register and said second register are specified within said compare and branch instruction.

4. The apparatus as claimed in claim 2, wherein said first value is a reference value specifying an array size and said second value is a test value determined from a decoded program instruction.

5. The apparatus as claimed in claim 4, wherein said comparison determines whether said reference value is greater than or equal to said test value.

6. The apparatus as claimed in claim 4, wherein said result of said comparison is determined from a carry flag value and zero flag value.

7. The apparatus as claimed in claim 2, wherein said branching operation comprises copying a pointer to said array bounds exception handling routine into a register specifying a next program instruction.

8. The apparatus as claimed in claim 1, wherein said data processing apparatus comprises a co-processor and said pre-programmed stored value is read from a register of said co-processor.

9. The apparatus as claimed in claim 1, wherein said compare and branch instruction is executed within a single processing cycle of said data processing apparatus when the branch is not taken.

10. The apparatus as claimed in claim 1, wherein said instruction decoder is operable to decode translated platform-independent program instructions.

11. The apparatus as claimed in claim 10, wherein, said platform independent program instructions are one of:
    Java bytecodes;
    .net bytecodes;
    MSIL bytecodes; and
    CIL bytecodes.

12. The apparatus as claimed in claim 1, wherein said data processing apparatus is operable in a user mode and a privileged mode and said data processing apparatus remains in said user mode during execution of said compare and branch instruction.

13. A method of processing data with an apparatus for processing data having processing logic operable to perform data processing operations and an instruction decoder operable to decode a compare and branch instruction to control said processing logic to perform data processing operations specified by said program instructions, said method comprising the steps of:
    (i) performing a comparison between a first value stored in a first register and a second value stored in a second register;
    (ii) copying a program counter value, in dependence upon said comparison, to a third register;
    (iii) determining a target branch address from a pre-programmed stored value and said program counter value; and
    (iv) branching to a sub-routine at said target branch address in dependence upon a result of said comparison.

14. The method as claimed in claim 13, wherein said instruction is an array bounds checking instruction and said sub-routine is an array bounds exception handling routine.

15. The method as claimed in claim 13, wherein at least one of said first register and said second register are specified within said compare and branch instruction.

16. The method as claimed in claim 14, wherein said first value is a reference value specifying an array size and said second value is a test value determined from a decoded program instruction.

17. The method as claimed in claim 16, wherein said comparison determines whether said reference value is greater than or equal to said test value.

18. The method as claimed in claim 16, wherein said result of said comparison is determined from a carry flag value and a zero flag value.

19. The method as claimed in claim 14, wherein said branching operation comprises copying a pointer to said array bounds exception handling routine into a register specifying a next program instruction.

20. The method as claimed in claim 13, wherein said data processing apparatus comprises a co-processor and said pre-programmed stored value is read from a register of said co-processor.

21. The method as claimed in claim 13, wherein said compare and branch instruction is executed within a single processing cycle of said data processing apparatus when the branch is not taken.

22. The method as claimed in claim 13, wherein said instruction decoder is operable to decode translated platform-independent program instructions.

23. The method as claimed in claim 22, wherein said platform independent program instructions are one of:
    Java bytecodes;
    .net bytecodes;
    MSIL bytecodes; and
    CIL bytecodes.

24. The method as claimed in claim 13, wherein said data processing apparatus is operable in a user mode and a privileged mode and said data processing apparatus remains in said user mode during execution of said compare and branch instruction.

25. A computer program product comprising a computer-readable storage medium including a computer program operable to control an apparatus for processing data having processing logic operable to perform data processing operations and an instruction decoder operable to decode a compare and branch instruction to control said processing logic to perform data processing operations specified by said program instructions, said computer program comprising the steps of:
    (i) performing a comparison between a first value stored in a first register and a second value stored in a second register;
    (ii) copying a program counter value, in dependence upon said comparison, to a third register;
    (iii) determining a target branch address from a pre-programmed stored value; and
    (iv) branching to a sub-routine at said target branch address in dependence upon a result of said comparison.

26. The computer program product as claimed in claim 25, wherein said instruction is an array bounds checking instruction and said sub-routine is an array bounds exception handling routine.

27. The computer program product as claimed in claim 25, wherein at least one of said first register and said second register are specified within said compare and branch instruction.

28. The computer program product as claimed claim 26, wherein said first value is a reference value specifying an array size and said second value is a test value determined from a decoded program instruction.

29. The computer program product as claimed in claim 28, wherein said comparison determines whether said reference value is greater than or equal to said test value.

30. The computer program product as claimed in claim 28, wherein said result of said comparison is determined from a carry flag value and a zero flag value.

31. The computer program product as claimed in claim 26, wherein said branching operation comprises copying a pointer to said array bounds exception handling routine into a register specifying a next program instruction.

32. The computer program product as claimed in claim 25, wherein said data processing apparatus comprises a co-processor and said pre-programmed stored value is read from a register of said co-processor.

33. The computer program product as claimed in claim 25, wherein said compare and branch instruction is executed within a single processing cycle of said data processing apparatus when the branch is not taken.

34. The computer program product as claimed in claim 25, wherein said instruction decoder is operable to decode translated platform-independent program instructions.

35. The computer program product as claimed in claim 34, wherein said platform independent program instructions are one of:
   Java bytecodes;
   .net bytecodes;
   MSIL bytecodes; and
   CIL bytecodes.

36. The computer program product as claimed in claim 25, wherein said data processing apparatus is operable in a user mode and a privileged mode and said data processing apparatus remains in said user mode during execution of said compare and branch instruction.

37. A computer program product comprising a computer-readable storage medium including a computer program operable to translate non-native program instructions to form native program instructions directly decodable by an apparatus for processing data having processing logic operable to perform data processing operations and an instruction decoder operable to decode a compare and branch instruction to control said processing logic to perform data processing operations specified by said program instructions, said native program instructions comprising:
   (i) performing a comparison between a first value stored in a first register and a second value stored in a second register;
   (ii) copying a program counter value, in dependence upon said comparison, to a third register,
   (iii) determining a target branch address from a pre-programmed stored value; and
   (iv) branching to a sub-routine at said target branch address in dependence upon a result of said comparison.

38. The computer program product as claimed in claim 37, wherein said instruction is an array bounds checking instruction and said sub-routine is an array bounds exception handling routine.

39. The computer program product as claimed in claim 37, wherein at least one of said first register and said second register are specified within said compare and branch instruction.

40. The computer program product as claimed in claim 38, wherein said first value is a reference value specifying an array size and said second value is a test value determined from a decoded program instruction.

41. The computer program product as claimed in claim 40, wherein said comparison determines whether said reference value is greater than or equal to said test value.

42. The computer program product as claimed in claim 40, wherein said result of said comparison is determined from a carry flag value and a zero flag value.

43. The computer program product as claimed in claim 38, wherein said branching operation comprises copying a pointer to said array bounds exception handling routine into a register specifying a next program instruction.

44. The computer program product as claimed in claim 37, wherein said data processing apparatus comprises a co-processor and said pre-programmed stored value is read from a register of said co-processor.

45. The computer program product as claimed in claim 37, wherein said compare and branch instruction is executed within a single processing cycle of said data processing apparatus when the branch is not taken.

46. The computer program product as claimed in claim 37, wherein said instruction decoder is operable to decode translated platform-independent program instructions.

47. The computer program product as claimed in claim 46, wherein said platform independent program instructions are one of:
   Java bytecodes;
   .net bytecodes;
   MSIL bytecodes; and
   CIL bytecodes.

48. The computer program product as claimed in claim 37, wherein said data processing apparatus is operable in a user mode and a privileged mode and said data processing apparatus remains in said user mode during execution of said compare and branch instruction.

* * * * *